United States Patent
Macioce, Jr. et al.

(10) Patent No.: US 11,255,755 B2
(45) Date of Patent: Feb. 22, 2022

(54) ENCLOSURE SYSTEM FOR INDOOR TIRE TESTING

(71) Applicant: Bridgestone Americas Tire Operations, LLC, Nashville, TN (US)

(72) Inventors: Richard J. Macioce, Jr., Massillon, OH (US); Matthew J. Reda, Copley, OH (US); David O. Stalnaker, Brentwood, TN (US); Erik F. Knuth, Hudson, OH (US); Daniel M. Francis, Jr., Stow, OH (US)

(73) Assignee: Bridgestone Americas Tire Operations, LLC, Nashville, TN (US)

(*) Notice: Subject to any disclaimer, the term of this patent is extended or adjusted under 35 U.S.C. 154(b) by 306 days.

(21) Appl. No.: 16/625,388

(22) PCT Filed: Jun. 19, 2018

(86) PCT No.: PCT/US2018/038164
§ 371 (c)(1),
(2) Date: Dec. 20, 2019

(87) PCT Pub. No.: WO2019/005529
PCT Pub. Date: Jan. 3, 2019

(65) Prior Publication Data
US 2021/0364391 A1    Nov. 25, 2021

Related U.S. Application Data

(60) Provisional application No. 62/527,107, filed on Jun. 30, 2017.

(51) Int. Cl.
*G01M 17/02* (2006.01)
*B60C 25/00* (2006.01)
*G01K 3/00* (2006.01)

(52) U.S. Cl.
CPC ......... *G01M 17/022* (2013.01); *B60C 25/007* (2013.01); *G01K 3/005* (2013.01)

(58) Field of Classification Search
None
See application file for complete search history.

(56) References Cited

U.S. PATENT DOCUMENTS 2,367,838 A    1/1945 Allen
6,532,811 B2   3/2003 Turner
(Continued)

FOREIGN PATENT DOCUMENTS

CN    102426145         4/2012
CN    103403518 A   *  11/2013 .......... G01M 17/022
(Continued)

OTHER PUBLICATIONS

English Machine Translation of JP5399979.
(Continued)

*Primary Examiner* — Peter J Macchiarolo
*Assistant Examiner* — Jermaine L Jenkins

(57) ABSTRACT

A method of testing a tire is employed in an enclosed system having a drum enclosure connected to a tire enclosure by flexible bellows, the enclosed system configured such that a tire inside the tire enclosure abuts a drum inside the drum enclosure. The method includes rotating the drum at a first angular velocity, thereby causing the tire to rotate at the first angular velocity. The method further includes measuring a temperature at a first location adjacent the tire and blowing cool air into the tire enclosure when the measured temperature exceeds a predetermined temperature threshold. The method also includes measuring a humidity level at a second location and adding moisture in the tire enclosure when the measured humidity level falls below a predetermined humidity threshold.

20 Claims, 4 Drawing Sheets

(56) References Cited

U.S. PATENT DOCUMENTS

| | | | |
|---|---|---|---|
| 7,254,996 B2 | 8/2007 | Ouyang | |
| 7,819,000 B2 | 10/2010 | Iwase | |
| 7,963,158 B2 | 6/2011 | Mizone | |
| 8,196,462 B2 | 6/2012 | Stalnaker | |
| 8,347,703 B2 * | 1/2013 | Yurjevich | G01M 17/024 |
| | | | 73/146 |
| 9,739,690 B2 * | 8/2017 | Litz | G01M 17/022 |
| 2010/0031740 A1 * | 2/2010 | Olex | G01M 17/022 |
| | | | 73/146 |
| 2015/0033840 A1 | 2/2015 | Litz | |

FOREIGN PATENT DOCUMENTS

| | | |
|---|---|---|
| CN | 205404136 | 7/2016 |
| EP | 2267426 | 12/2010 |
| JP | 7020029 | 1/1995 |
| JP | 4076380 | 2/2008 |
| JP | 2013170929 | 9/2013 |
| JP | 5399979 | 11/2013 |
| JP | 2014066608 | 4/2014 |
| JP | 2014211317 A * | 11/2014 |
| KR | 20010045872 | 6/2001 |
| KR | 20040009189 | 1/2004 |

OTHER PUBLICATIONS

English Machine Translation of JP2014066608.
English Machine Translation of JP4076380.
English Machine Translation of CN205404136.
English Machine Translation of JP7020029.
English Machine Translation of CN102426145.
English Machine Translation of JP2013170929.
English Machine Translation of KR2004009189.
English Machine Translation of KR20010045872.

* cited by examiner

ENCLOSURE SYSTEM FOR INDOOR TIRE TESTING

FIELD OF INVENTION

This disclosure relates to the field of tire testing. More particularly, this disclosure relates to the field of indoor wear testing of a tire.

BACKGROUND

Indoor wear testing is known to employ a roadway simulator such as a drum or a flat belt. During testing, the tire is rotated against an outer surface of the roadway simulator, which may be configured to simulate a road surface such as a concrete or blacktop road. The tire is mounted to a wheel assembly that is forced toward the roadway simulator, thereby applying a radial load on the tire to simulate the weight of an automobile. The wheel assembly may be mounted to an adjustable carriage that can adjust angular and axial positions of the wheel assembly, thereby changing the contact footprint of the tire and the forces on the tire. By changing the angular placement of the tire on the roadway simulator, the system can measure tread wear, static and dynamic forces and moments, and other parameters.

SUMMARY OF THE INVENTION

In one embodiment, a tire testing system includes a rotatable drum and a rotatable spindle configured to receive a tire and hold the tire in contact with the rotatable drum. The system further includes a drum enclosure having a drum enclosure opening and a tire enclosure separate from the drum enclosure having a tire enclosure opening. The system further includes flexible bellows having a first end connected to the drum enclosure opening and a second end connected to the tire enclosure opening. The system also includes a powder dispensing system configured to inject powder at a predetermined flow rate into the tire enclosure.

In another embodiment, a method of testing a tire is employed in an enclosed system having a drum enclosure connected to a tire enclosure by flexible bellows, the enclosed system configured such that a tire inside the tire enclosure abuts a drum inside the drum enclosure. The method includes rotating the drum at a first angular velocity, thereby causing the tire to rotate at the first angular velocity. The method further includes measuring a temperature at a first location adjacent the tire and blowing cool air into the tire enclosure when the measured temperature exceeds a predetermined temperature threshold. The method also includes measuring a humidity level at a second location and adding moisture in the tire enclosure when the measured humidity level falls below a predetermined humidity threshold.

In yet another embodiment, an enclosed system for testing a tire includes a first enclosure having a testing drum and a first enclosure opening. The system further includes a second enclosure separate from the first enclosure, the second enclosure having a tire spindle and a second enclosure opening. The system also includes flexible bellows having a first end connected to the first enclosure opening and a second end connected to the second enclosure opening. The system also has a climate control system connected to at least one of the first enclosure and the second enclosure, the climate control system being configured to control a temperature level and a humidity level.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

Figure 1:
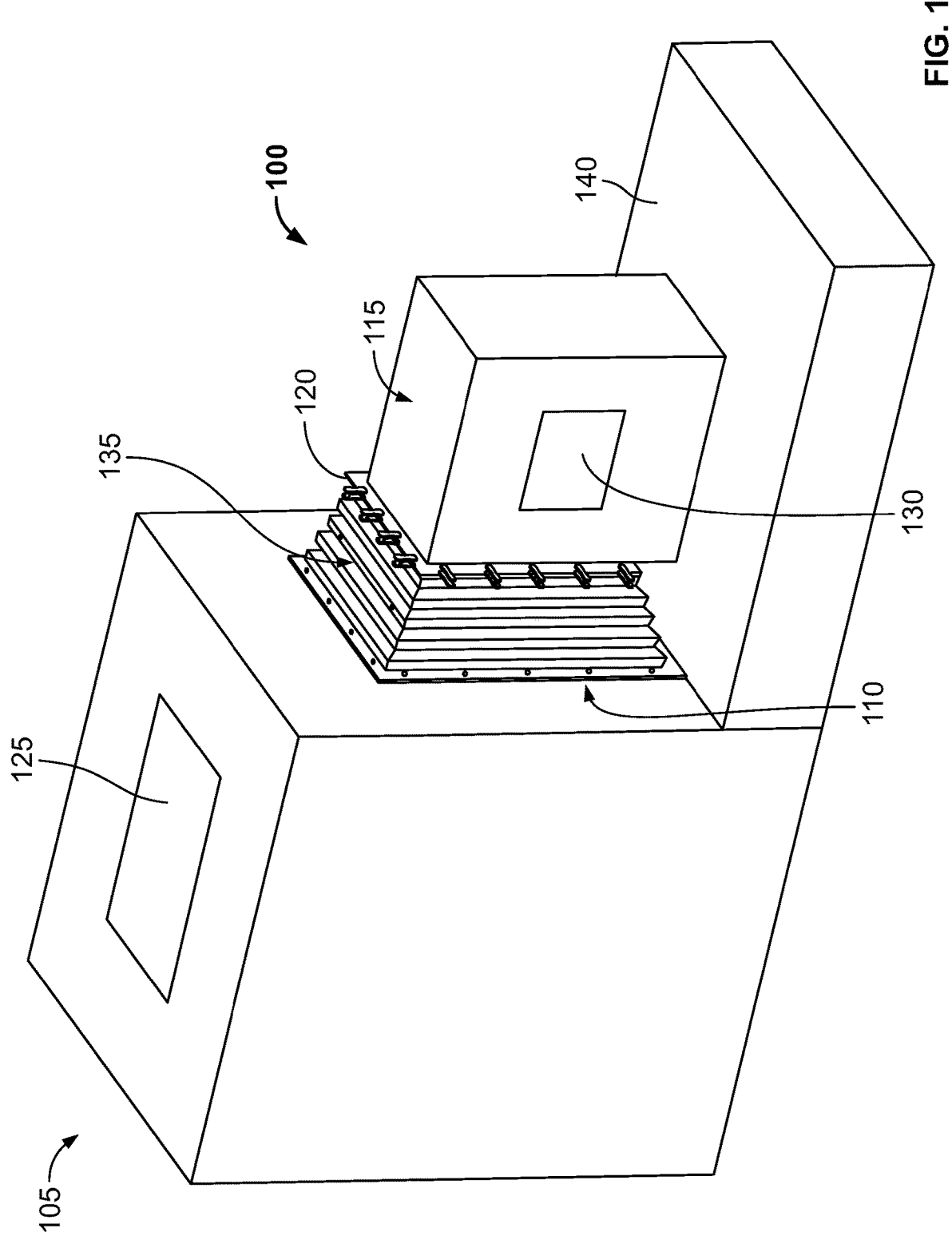
FIG. 1 is a partial perspective view of one embodiment of an enclosed tire testing system 100.

FIG. 1 illustrates a partial perspective view of one embodiment of an enclosed tire testing system 100. The enclosed tire testing system 100 includes a drum enclosure 105 having a first opening 110 and a tire enclosure 115 having a second opening 120. The drum enclosure also includes drum access doors 125 and the tire enclosure includes tire access doors 130. The access doors 125, 130 provide access for an operator to insert or remove a tire or to perform maintenance (such as servicing wear plates on a drum).

In one embodiment, the drum enclosure 105 and the tire enclosure 115 are constructed of metal, such as structural steel. In an alternative embodiment, all or a portion of the drum enclosure and the tire enclosure may be constructed of a polymeric material. One or both enclosures may include viewing windows constructed of glass or a polymeric material.

A flexible bellow 135 has a first end connected to the first opening 110 of the drum enclosure 105 and a second end connected to the second opening 120 of the tire enclosure 115. Together, the drum enclosure 105, the tire enclosure 115, and the flexible bellows 135 form a fully enclosed system. In the illustrated embodiment, the flexible bellows 135 are bolted to the drum enclosure 105 and the tire enclosure 115. However, it should be understood that other fasteners may be employed. In one embodiment, the flexible bellows 135 are constructed of fabric, such as Kevlar Aramid Fabric or elastic urethane polyester. In an alternative embodiment, the flexible bellows are constructed of rubber or a polymeric material.

The drum enclosure 105 is a stationary enclosure, while the tire enclosure 115 is disposed on a movable base 140. The movable base 140 allows the tire enclosure 115 to be positioned closer to or further from the drum enclosure 105. When the movable base 140 is moved, the flexible bellows 135 expand or contract accordingly so that the system remains fully enclosed. In an alternative embodiment (not shown) the drum enclosure is mounted on a movable base.

Figure 2:
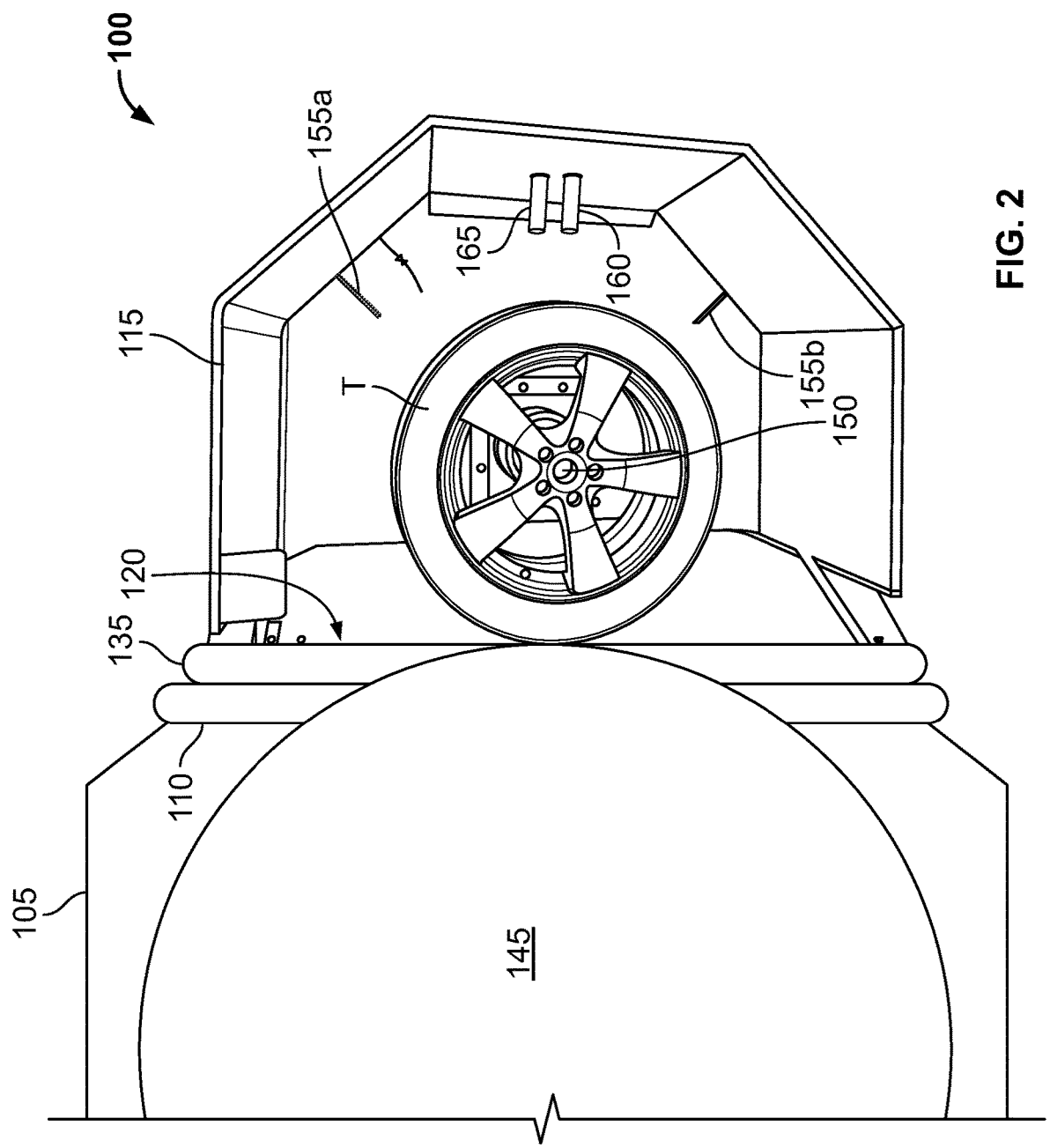
FIG. 2 is a partial cross-section of the enclosed tire testing system 100.

FIG. 2 illustrates a partial cross-section of the enclosed tire testing system 100. As can be seen in this view, a rotatable testing drum 145 is housed in the drum enclosure 105. In one embodiment, the surface of the testing drum 145 is covered by a plurality of plates. The plates have surfaces configured to simulate a road surface. Alternatively, the plates may have projections configured to chip or tear a tire. In an alternative embodiment, the drum does not have plates, but instead has a circumferential surface configured to engage a tire.

The rotatable testing drum 145 rotates about a central axis that is connected to a motor (not shown). A control system (not shown) controls the angular velocity of the testing drum 145. The testing drum 145 may be operated at different speeds and may be rotated in a clockwise or counterclockwise direction. In the illustrated embodiment, a portion of the testing drum 145 extends through the first opening 110 of the drum enclosure 105 and into a region enclosed by the flexible bellows 135. In an alternative embodiment (not shown), the entire testing drum is disposed inside of the drum enclosure.

In an alternative embodiment (not shown), the drum may be replaced with a driven belt. The belt may be driven about two or more rollers. The belt may be covered by a plurality of plates having surfaces configured to simulate a road surface, or projections configured to chip or tear a tire. In an alternative embodiment, the belt surface is configured to engage a tire.

With continued reference to FIG. 2, the tire enclosure 115 includes a tire spindle 150 configured to rotatably support a tire and wheel assembly T. The tire spindle 150 does not drive the tire and wheel assembly T. Instead, after the tire and wheel assembly T is mounted on the tire spindle 150, the tire enclosure 115 is moved on the movable base 140 towards the drum enclosure 110 until the tire contacts the surface of the drum 145. Then, the drum 145 is rotated at a first angular velocity, which causes the tire and wheel assembly T to also rotate at the first angular velocity. In an alternative embodiment, the tire spindle does drive (and retard) the tire and wheel assembly.

In the illustrated embodiment, the tire and wheel assembly T includes a passenger tire. In alternative embodiments, the tire may be a light truck tire, a medium truck tire, or a heavy truck tire. In still other alternative embodiments, the tire may be a larger tire, such as an agricultural tire.

The tire spindle 150 is controlled by a spindle control system (not shown) that applies a radial load on the tire towards the drum 145, thereby simulating the weight of an automobile. The spindle control system also adjusts a position of the tire spindle 150 to change the lateral position, camber, or slip angle of the tire and wheel assembly T. The spindle control system may also simulate cornering or other maneuvers. The spindle control system can also adjust the tire spindle drive (and retard) speed, thereby controlling acceleration and deceleration. In one embodiment, the spindle control system simulates the driving of a vehicle over an actual course.

In the illustrated embodiment, two temperature sensors 155 are disposed inside of the tire enclosure 115. The two temperature sensors include a first temperature sensor 155a disposed above the tire and wheel assembly T and a second temperature sensor 155b disposed below the tire and wheel assembly T. In this embodiment, the tire and wheel assembly T is disposed in a substantially vertical orientation. In other embodiments (not shown), the tire and wheel assembly T may be disposed at an angle or in a substantially horizontal orientation. In such embodiments, the first temperature sensor is disposed proximate to a first side of the tire spindle, and a second temperature sensor is disposed proximate to a second side of the tire spindle.

In one embodiment, an average temperature is calculated, based on measurements from the first temperature sensor 155a and the second temperature sensor 155b. A given point on a tire tread may increase in temperature as that point rolls over a surface, and then decrease in temperature as it passes through the air while the tire continues its revolution. Thus, it may be beneficial to employ multiple temperature sensors at different locations adjacent to a tire tread. It may also be beneficial to place sensors at equal, but opposite angular distances from a point of contact between the tire and wheel assembly T and the drum 145. Placement of temperature sensors in this manner may result in consistent average temperature results regardless of the direction of rotation of the tire and wheel assembly T.

In the illustrated embodiment, if the center of the point of contact between the tire and wheel assembly T and the drum 145 is defined as 0°, the first temperature sensor 155a is located at an angular position of approximately 135° and the second temperature sensor 155b is located at an angular position of approximately −135°. In an alternative embodiment (not shown), the first temperature sensor is located at an angular position of approximately 90° and the second temperature sensor is located at an angular position of approximately −90°. In other alternative embodiments, the first temperature sensor is located at any angular position between 0° and 180° and the second temperature sensor is located at any angular position between 0° and −180°. In another alternative embodiment, more than two temperature sensors are disposed in the tire enclosure. In another alternative embodiment, only a single temperature sensor is employed.

The tire enclosure 115 further includes an air inlet 160 for introducing air into the system. The air inlet 160 is connected to a source of cool air, such as an HVAC system (not shown). In an alternative embodiment, the air inlet is connected to a source of warm air.

The cool air is employed to cool the interior of the tire enclosure 115 to offset heat generated by the rotation of the drum 145 and friction between the drum 145 and the tire and wheel assembly T. In one embodiment, a controller (not shown) is in communication with the temperature sensors 155 and controls the temperature or the air flow of the cool air based on the measured and calculated temperature. Thus, the controller can maintain a consistent temperature within the tire enclosure 115. For example, the controller may blow cool air into the tire enclosure when the measured and calculated temperature exceeds a predetermined temperature threshold and cease blowing when the measured and calculated temperature falls below the predetermined temperature threshold. In an alternative embodiment, the controller is in communication with the temperature sensors 155 and controls the temperature or the air flow of the cool air to vary the temperature within the tire enclosure 115 over time according to a predetermined temperature profile. For example, the temperature profile may simulate the change of seasons in a geographic region.

The tire enclosure 115 further includes a powder dispensing nozzle 165. The powder dispensing nozzle 165 is connected to a powder dispensing system configured to inject powder at a pre-determined flow rate inside the tire enclosure. The powder is a de-gumming powder that is injected into the tire enclosure 115 to prevent the tire from gumming and sticking to the drum 145. One example of a de-gumming powder is silica powder. However, it should be understood that any powder may be employed.

In one embodiment, the powder is supplied by a hopper (not shown) and injected at a constant flow rate of less than 20 cubic feet per minute (CFM). However, it should be understood that any flow rate may be employed. In an alternative embodiment, powder is not used.

Figure 3:
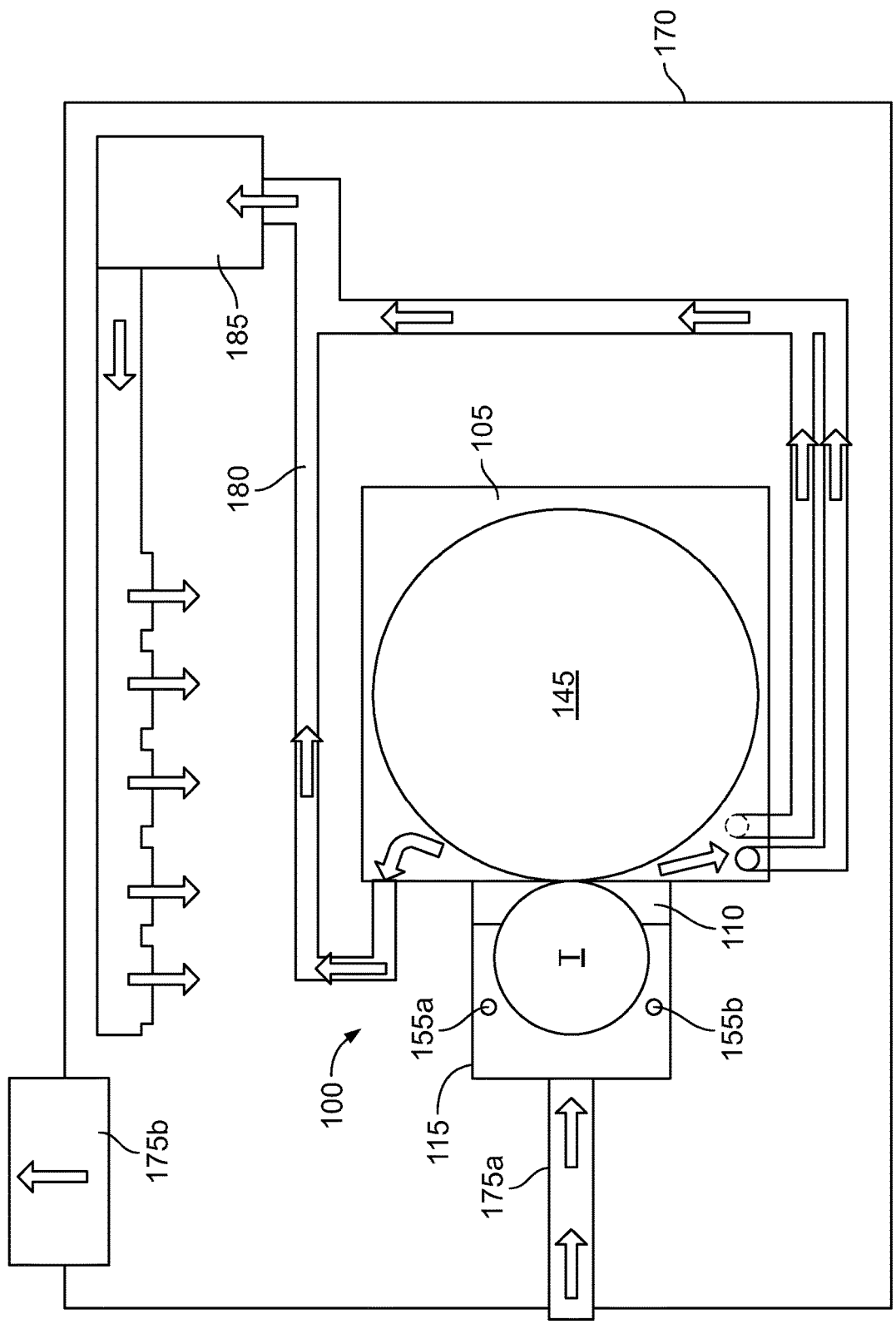
FIG. 3 is a schematic drawing illustrating the enclosed tire testing system 100 and a ventilation system.

FIG. 3 is a schematic drawing of the enclosed tire testing system 100. As can be seen from this view, the tire testing system 100 includes a ventilation system and is housed in a test cell 170. The ventilation system includes an HVAC intake 175a that introduces air from outside the cell 170 and an HVAC exhaust 175b that returns air to the outside. The tire testing system 100 further includes a series of ducts 180 that lead to a dust collector system 185.

In one embodiment, the HVAC intake 175a blows air into the tire enclosure 105 at a variable flow rate between 0 and 2,750 CFM. In one particular embodiment, the HVAC intake 175a blows air into the tire enclosure 105 at a variable flow rate between 400 and 1,500 CFM.

In one embodiment, the drum enclosure 105 and the tire enclosure 115 are in a vacuum with a negative pressure of 3,000 CFM. In the illustrated embodiment, three separate ducts 180 are connected to the drum enclosure. Thus, dust is removed from the drum enclosure at a flow rate of about 1,000 CFM in each duct 180. The ducts 180 are joined before reaching the dust collector 185. Thus, air enters the dust collector 185 at a flow rate of 3,000 CFM and is exhausted back into the test cell 170 after dust is removed. The air is then exhausted to the exterior of the test cell 170 through the HVAC exhaust 175b. In alternative embodiments, any number of ducts may be employed, and air may be evacuated at any flow rate.

The ventilation system includes a plurality of openings on each of the drum enclosure 105 and the tire enclosure 115, with a duct connected to each opening. The ducts are connected to a vacuum (not shown) that creates a negative pressure inside the enclosed tire testing system 100. The negative pressure creates an air flow to assist in the cooling of the interior of the tire enclosure 115 and the drum enclosure 105.

The negative pressure and the air flow also assists in the removal of powder injected into the tire enclosure 115. At least some of the ducts are connected to the dust collector system 175. The dust collector system 175 captures the powder (including rubber particles as they are ground away from the tire) that is removed from the tire enclosure 115 so that it may be disposed of or recycled.

In one embodiment, a humidity control sensor is located inside at least one of the ducts. The humidity control sensor measures a humidity level of the system. The humidity control sensor is in communication with a controller (not shown). The humidity control system is configured to add moisture in the tire enclosure when the humidity level falls below a predetermined humidity threshold. The humidity control system may be further configured to remove moisture from the tire enclosure when the humidity level exceeds a second predetermined humidity threshold. In an alternative embodiment, two or more humidity sensors are employed. In another alternative embodiment a single sensor may measure both temperature and humidity.

In one embodiment, the humidity control system is the same HVAC system that supplies cool air to the tire enclosure. In such an embodiment, the HVAC system is a climate control system configured to control a temperature level and a humidity level within the enclosed tire testing system 100.

The climate control system may be employed to test each tire in consistent temperature and humidity conditions. Thus, the climate control system may be used to set the temperature and humidity at a desired level for the testing of multiple tires. The climate control system may also be used to test a particular tire in a particular condition. For example, it may be desirable to simulate a cold and dry climate for a tire designed for use in winter or a cold geographic region. As another example, it may be desirable to simulate a hot and humid climate for a tire designed for use in summer or a warm geographic region.

Figure 4:
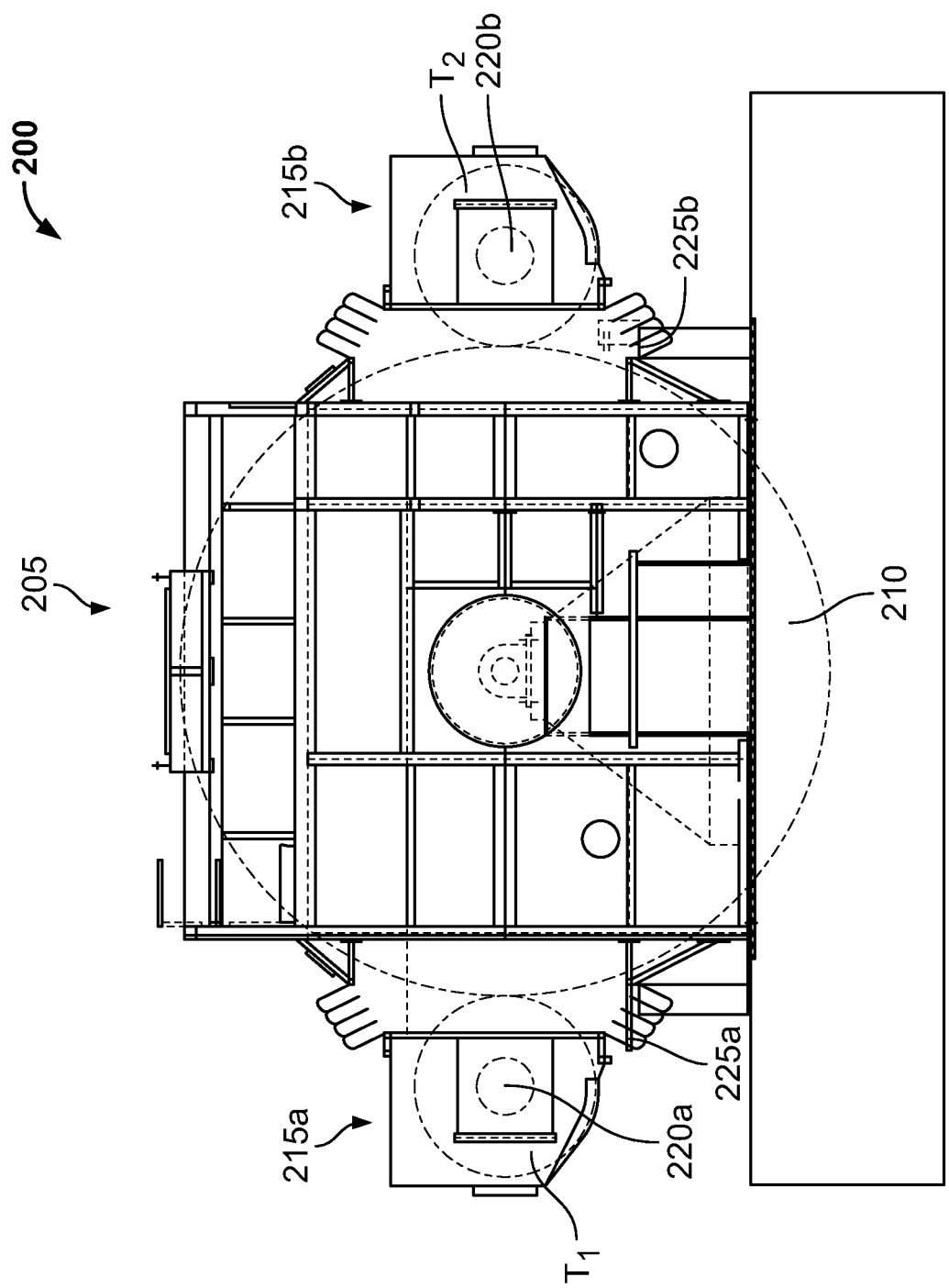
FIG. 4 is a cross-section of an alternative embodiment of an enclosed tire testing system.

FIG. 4 is a cross-section of an alternative embodiment of an enclosed tire testing system 200. The enclosed tire testing system 200 is substantially the same as the enclosed tire testing system 100 illustrated in FIGS. 1-3 and described above (including the alternative embodiments discussed), except for the differences detailed below.

The enclosed tire testing system 200 includes a drum enclosure 205 that houses a rotatable drum 210. The enclosed tire testing system 200 further includes a first tire enclosure 215a and a second tire enclosure 215b. Each of the first and second tire enclosures 215a,b are connected to the drum enclosure 205. In the illustrated embodiment, the first and second tire enclosures 215a,b are connected to opposite sides of the drum enclosure 205. However, in alternative embodiments, the first and second tire enclosures 215a,b may be connected to any portion of the drum enclosure 205. In another alternative embodiment, the enclosed tire testing system includes three or more tire enclosures.

The first tire enclosure 215a houses a first tire spindle 220a configured to hold a first tire and wheel assembly $T_1$. The first tire enclosure 215a is connected to the drum enclosure 205 via first flexible bellows 225a.

The second tire enclosure 215b houses a second tire spindle 220b configured to hold a second tire and wheel assembly $T_2$. The second tire enclosure 215b is connected to the drum enclosure 205 via second flexible bellows 225b.

The first and second tire enclosures 215a,b allow multiple tires to be tested at the same time. Testing may be performed in any of the manners described above.

In one embodiment, the drum enclosure 205 and the first and second tire enclosures 215a,b are under a vacuum pressure of 6,000 CFM. However, in alternative embodiments, the enclosures may be under any desired vacuum pressure.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative system and method, and illustrative examples shown and described. Accordingly, departures may be made from such details without departing from the spirit or scope of the applicant's general inventive concept.

What is claimed is:

1. A tire testing system comprising:
   a rotatable drum;
   a rotatable spindle configured to receive a tire and hold the tire in contact with the rotatable drum;
   a drum enclosure having a drum enclosure opening;
   a tire enclosure separate from the drum enclosure, the tire enclosure having a tire enclosure opening;
   flexible bellows having a first end connected to the drum enclosure opening and a second end connected to the tire enclosure opening; and
   a powder dispensing system configured to inject powder at a predetermined flow rate into the tire enclosure.

2. The system of claim 1, further comprising a temperature control system connected to the tire enclosure.

3. The system of claim 2, wherein the temperature control system includes a pair of temperature sensors located in the tire enclosure.

4. The system of claim 1, further comprising a humidity control system, including a humidity control sensor.

5. The system of claim 1, further comprising:
   a second tire enclosure separate from the drum enclosure, the second tire enclosure having a second tire enclosure opening; and
   second flexible bellows having a first end connected to a second drum enclosure opening and a second end connected to the second tire enclosure opening.

6. The system of claim 1, further comprising a ventilation system configured to apply a net negative pressure to the tire enclosure.

7. A method of testing a tire in an enclosed system having a drum enclosure connected to a tire enclosure by flexible bellows, the enclosed system configured such that a tire inside the tire enclosure abuts a drum inside the drum enclosure, the method comprising:
   rotating the drum at a first angular velocity, thereby causing the tire to rotate at the first angular velocity;
   measuring a temperature at a first location adjacent the tire;
   blowing cool air into the tire enclosure when the measured temperature exceeds a predetermined temperature threshold;
   measuring a humidity level at a second location; and
   adding moisture in the tire enclosure when the measured humidity level falls below a predetermined humidity threshold.

8. The method of claim 7, further comprising removing moisture from the tire enclosure when the measured humidity level exceeds a second predetermined humidity threshold.

9. The method of claim 8, further comprising adjusting a camber of the tire during rotation of the drum.

10. The method of claim 8, further comprising adjusting a slip angle of the tire during rotation of the drum.

11. The method of claim 8, further comprising adjusting a lateral position of the tire during rotation of the drum.

12. The method of claim 8, further comprising injecting powder at a predetermined flow rate into the tire enclosure.

13. The method of claim 12, further comprising applying a negative pressure to the tire enclosure to remove powder from the tire enclosure.

14. The method of claim 8, further comprising rotating the drum at a second angular velocity different from the first angular velocity, thereby causing the tire to rotate at the second angular velocity.

15. The method of claim 14, wherein the first angular velocity has a first direction and the second angular velocity has a second direction opposite the first direction.

16. An enclosed system for testing a tire, the system comprising:
   a first enclosure having:
      a revolving test surface, and
      a first enclosure opening;
   a second enclosure separate from the first enclosure, the second enclosure having:
      a tire spindle, and
      a second enclosure opening;
   flexible bellows having a first end connected to the first enclosure opening and a second end connected to the second enclosure opening; and
   a climate control system connected to at least one of the first enclosure and the second enclosure, the climate control system being configured to control a temperature level and a humidity level.

17. The system of claim 16, further comprising a powder dispensing system configured to inject powder at a predetermined flow rate into the second enclosure.

18. The system of claim 17, further comprising a powder collection system.

19. The system of claim 16, wherein the climate control system includes at least one temperature sensor.

20. The system of claim 19, wherein the at least one temperature sensor includes a first temperature sensor proximate to a first side of the tire spindle, and a second temperature sensor proximate to a second side of the tire spindle.

* * * * *